Aug. 10, 1965  A. WASSERMAN  3,199,686
PATTERN CONTROLLED WORK FEEDER
Filed Nov. 15, 1962  3 Sheets-Sheet 1

INVENTOR.
ALVIN WASSERMAN
BY
Allen M Krass
ATTORNEY

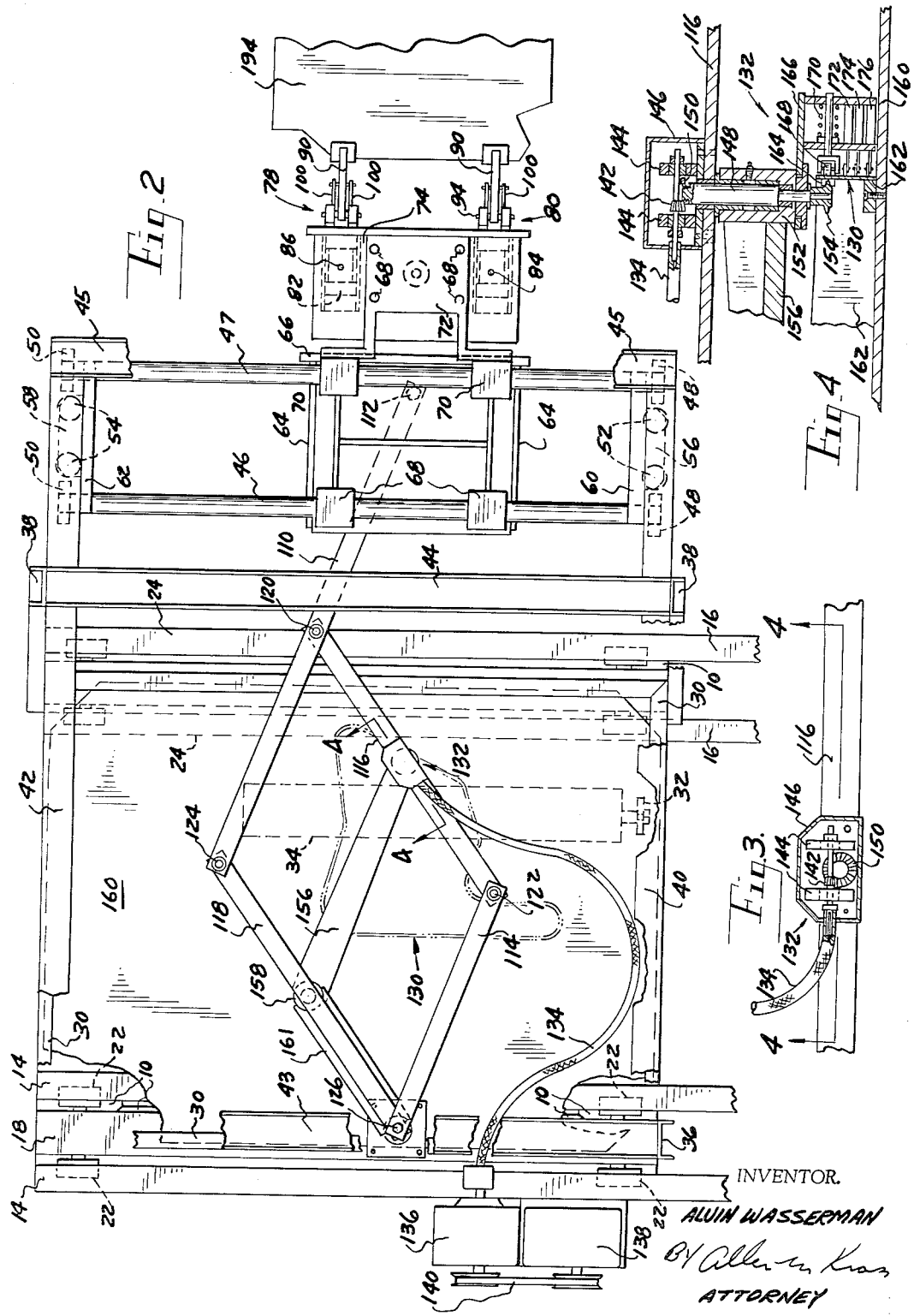

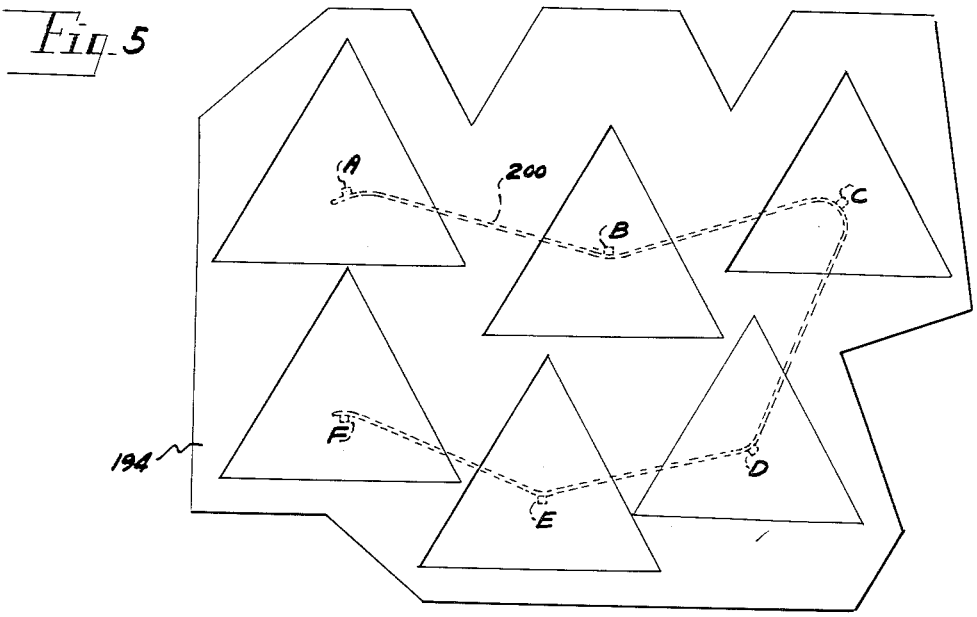
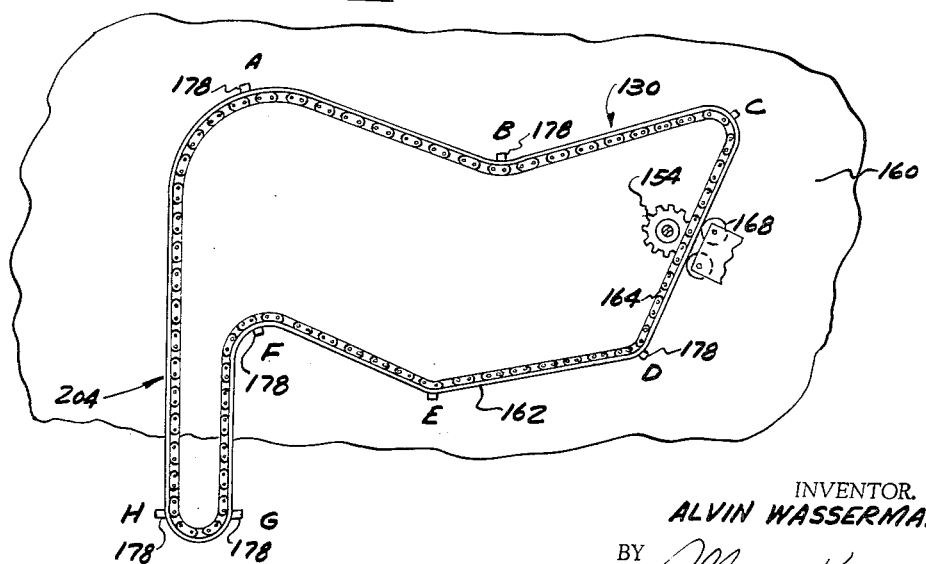

United States Patent Office 3,199,686
Patented Aug. 10, 1965

3,199,686
PATTERN CONTROLLED WORK FEEDER
Alvin Wasserman, 19145 Marlowe, Detroit, Mich.
Filed Nov. 15, 1962, Ser. No. 237,962
2 Claims. (Cl. 214—1)

This invention relates to a device for feeding a workpiece to a forming or cutting machine such as a punch press or drill press and more particularly to such a device which operates under the control of a pattern to bring the workpiece into a plurality of discrete positions with respect to such a machine.

The present invention provides means for grasping a work blank and for moving it in at least two dimensions under the control of a pattern which includes an elongated component. A tracer attaches to the pattern so as to follow the elongated component and is coupled to the work holder so as to cause the workpiece to move along a path similar to that of the pattern. Signal devices are disposed at various points on the elongated component and are adapted to initiate various actions of the loader when the tracer reaches the particular points at which these signal devices are disposed. A separate pattern is provided for each shape of work blank. Normally such blanks are produced in relatively large quantity by non-connected operations and the cost of preparing a pattern for such a blank is minimal when spread over a large number of parts.

While a point-to-point positioning system as known to the prior art might be used to control the present feeder mechanism from tapes, cards or other normal information storage media, such systems are complicated and expensive, and at their simplest, require a rather sophisticated programing operation. It is an object of the present invention to provide a control system for a work feeder which is low in cost, simple in operation and may be programed by a pattern that can be prepared by any mechanic.

In the present invention the workpiece moving means is connected to the controlling pattern by a pantograph type mechanism which is capable of introducing an amplification of motion between the two so that the pattern need not approximate the actual route traveled by the work holder but may be scaled up or down from that design.

The pattern further carries projections disposed at particular points which are used to actuate switches carried on the pantograph follower device. These switches are used to call into play such actions of the feeder as interrupting its motion to allow the press to strike, actuating or deactuating the work clamps and terminating the operation. These "auxiliary commands" provide a machine with a wide range of possible sequences of motions and a particular sequence may be varied and adjusted simply by changing the position of the lugs on the pattern.

In a preferred embodiment of the present invention, which will be subsequently described in detail, the work holder comprises a pair of clamps that may be actuated by fluid pressure. The clamps are supported on a platform. A fluid cylinder attached to the platform may be energized to adjust the positions of the clamp in a vertical direction with respect to the platform. The platform itself is supported on a pair of rods which are in turn supported on rails extending perpendicularly to the rods. The rods are free to move along the length of the rails and the platform is free to move along the length of the rods. Therefore the platform has freedom of motion along two perpendicular horizontal axes. A pantograph mechanism has one arm connecting to the platform and another arm supporting a tracer attached to the pattern. A motor powers the tracer about the pattern and the pantograph causes the platform and the work holders to duplicate the tracer's motion at an increased or decreased magnitude. Various limit switches which are supported on the tracer engage lugs on the pattern at particular points in the tracer's motion to initiate auxiliary commands. The entire assembly including the pattern, platform, rails and rods are movable along tracks which extend parallel to the rods so as to bring the entire assembly into and out of operating position with respect to the press. This movement is also actuated by the limit switches carried on the tracer.

It is therefore seen to be an object of the present invention to provide a loader for presses which includes work holders supported for free movement in at least two axes controlled by a tracer element which moves about a pattern which is a duplicate of the desired path of the work holder.

A further object is to provide such a system which operates under the control of lugs disposed about the pattern which control the initiation of various operaions that the loader is capable of.

Other objects, advantages and applications of the present invention will be made apparent by the following detailed description of a preferred embodiment of the invention. The description makes reference to the accompanying drawings in which:

FIGURE 2 is a top view of the loader;

FIGURE 3 is a detailed plan sectional view of the tracer mechanism;

FIGURE 4 is a detailed elevational view partly broken away, of the tracer mechanism;

FIGURE 5 is a drawing of a sheet metal blank which may be used in connection with the loader indicating the position of the various strikes of the press and the pattern traveled by the workpiece with respect to the press; and FIGURE 6 is a top view of a typical pattern employed in the loader.

Figure 1:
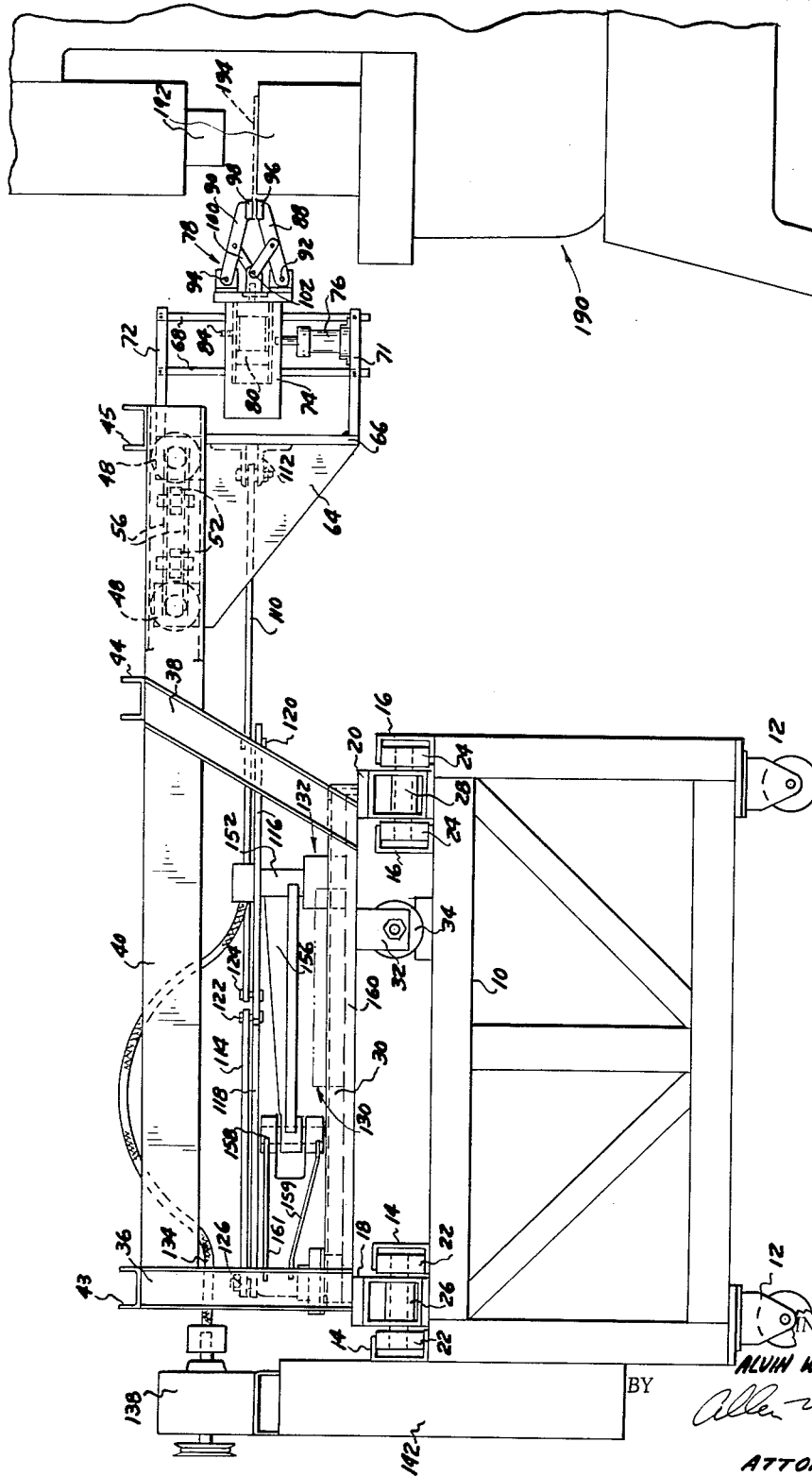
FIGURE 1 is a side view of a loader embodying the present invention shown in operating position with respect to a metal working press.

Referring to the drawings, the loader is supported above the floor on a base 10 which is preferably formed of welded structural steel and has casters 12 arranged at its four lower corners for the purpose of adjusting the initial position of the loader with respect to a serviced machine.

Mounted across the width of the two ends at the top of the base 10 are two pairs of channel sections 14 and 16 disposed in parallel relation with their channels facing one another. The channel pairs 14 and 16 extend beyond the base 10 in the direction away from the drawing sheet as viewed in FIGURE 1 for a length approximating the width of the base 10. While the other ends of the channel pairs 14 and 16 terminate at the opposite edge of the base 10 in other applications they might extend in that direction for a reasonable distance.

The channel pairs 14 and 16 act as rails for a pair of box sections 18 and 20 which ride along the channels on four sets of rollers 22 and 24, one set being disposed at each end of the box sections 18 and 20. Each pair of rollers is journaled within a bearing 26 and 28, the bearings being retained within the box sections 18 and 20.

The box sections 18 and 20 are of approximately the same width as the base 10 and a pair of beams 30 are welded across their opposite ends so as to form a rectangular frame. A plate 32 depends from the lower end of one of the frames 30 and is attached to the rod of a hydraulic cylinder 34. The cylinder 34 is supported on the base 10. Its rod may be extended or retracted under the control of a suitable powering circuit so as to cause the rectangular frame formed of beams 18, 20 and 30 to move with respect to the base 10 in a direction perpendicular to the plane of the sheet of FIGURE 1.

A pair of vertical channel sections 36 are attached at their lower ends to the opposite ends of the box section 18. Similarly a pair of inclined channel sections 38 rise up and away from the sections 36 at the opposite ends of the box sections 20. At their upper ends these channels support a pair of rails 40 and 42 which extend parallel to one another and to the rails 30. The rails 40 extend from the channel section 36 across the length of the base 10 to a point beyond the termination of the opposite edge of the base. As they are supported on the box sections 18 and 20 they move with these box sections under the power of the cylinder 34. The rails 40 and 42 are connected at their left hand edges as viewed in FIGURE 1 by a cross member 43, are connected adjacent to their points of attachment to the channels 38 by a second cross member 44 and are connected at their extreme right hand edges by a third cross member 45. Thus the rails 40 and 42 and the cross members 43 and 44 and 45 form a solid unitary structure.

A pair of cylindrical rods 46 and 47 are supported on the rails 40 and 42 by a roller assembly which includes pairs of rollers 48 and 50 fixed on the end of each rod and rotatably disposed about horizontal axes on the rails 40 and 42 respectively, and pairs of blocking rollers 52 and 54 which are disposed on blocks 56 and 58 on vertical axes and press against the sides of the rails 40 and 42 to prevent the rods 46 and 47 from cocking. The blocks 56 and 58 are attached to tie members 60 and 62 which extend between the rods 44 and 46 immediately adjacent to the rails 40 and 42. The two rods 46 and 47 and the tie members 60 and 62 form a unitary structure which is free to move along the rails 40 and 42. This rod structure moves with the rails 40 and 42 with respect to the base 10 under the power of the cylinder 34.

A platform comprising side members 64 and an end member 66 is movably retained on the two rods 44 and 46 by two sets of ball bushings 68 and 70. The ball bushings 68 and 70 allow the platform formed of the members 64 and 66 to move along the rods 44 and 46. Likewise the rods themselves can move along the rails 40 and 42 in a direction perpendicular to their extension. Therefore the platform is free to move in any direction in the horizontal plane by moving along the rods 44 and 46 and causing the rods to move along the rails 40 and 42.

A set of four guide bars 68 are disposed in a vertical position forward of the front plate 66. The bars 68 are supported with respect to the platform by means of a lower shelf 71 and an upper shelf 72.

A rectangular clamp housing 74 is supported on the guide bars 68 and has freedom of movement in a vertical direction along the guide bars. The vertical position of the clamp housing 74 is adjusted by a hydraulic cylinder 76 which is fixed on the lower shelf 71 and has its rod connected to the clamp housing. The housing 74 retains a pair of clamp assemblies generally indicated at 78 and 80. The assemblies 78 and 80 are spaced apart from one another in the same horizontal plane. They have cylindrical ends 80 and 82 which fit within cylindrical openings in the retainer 74. The cylindrical ends 80 and 82 slide within the openings may be adjusted by set screws 84 and 86. The clamp members are identical and only one will be described. They comprise a pair of lower and upper clamp arm members 88 and 90 respectively. The arm members are pivotably supported about horizontal trunnion mounts 92 and 94. At their extreme ends they carry pads 96 and 98 which actually grip the workpiece. Midway along their lengths the arms 88 and 90 are pivotably connected to a pair of links 100. These links are commonly joined at their opposite end to rods 102 of cylinders disposed within each of the cylindrical housings 80. When a particular cylinder extends its rod it forces the arms 88 and 90 away from one another, when it retracts its rod it pulls the two arms together engaging the workpiece in the pads 96 and 98.

The motion of the platform in the horizontal plane is controlled by a pantograph arm 110 connected to the platform by means of a trunnion mount 112 attached to back of the vertical plate 66. The parallelogram arrangement of the pantograph is completed by three arms 114, 116 and 118. The two pairs of arms 110 and 114, 116 and 118 respectively form the two parallel sides of the parallelogram. The arms 110 and 116 are connected by a pivotable joint 120; the arm 116 is joined to the arm 114 by a pivotable joint 122 and the arm 118 is joined to the arm 110 by a pivotable joint 124. Both the arms 114 and 118 are pivotably fixed with respect to the box member 8 at a joint 126.

At this juncture it is apparent that if any point on the pantograph mechanism is moved over a two dimensional route within its limits of motion the clamp carrying platform will follow a similar but enlarged route because of the connection between the pantograph arm 110 and the platform. The route which is desired for the pantograph arm to follow is embodied in a pattern, generally indicated at 130 which will be subsequently described in detail. The pantograph arm is made to follow the pattern 130 by a tracer mechanism, generally indicated at 132, which will now be described in detail.

The tracer mechanism 132, which is disclosed in detail in FIGURES 3 and 4, supported below the center point of the pantograph linkage 116. It is powered by a flexible shaft 134 connected to the shaft of an electric clutch and brake 136. The clutch and brake is driven by an electric motor 138 through a pulley 140. Both the motor 138 and the clutch and brake 136 are supported on an electric panel 142 attached to the side of the base 10.

The shaft 134 connects to a bevel gear 142 which is journaled in two blocks 144 within a housing 146.

The gear 142 drives a shaft 148 through a mating gear 150. The shaft 148 is journaled in the arm 116 and passes through a bushing in a support member 152 to terminate in a gear 154 which rides the pattern as will be subsequently described. The support member is carried at the end of an arm 156 which extends below the pantograph mechanism and bisects it. At its other end the arm 156 is trunnion mounted in a joint 158 that is carried by a pair of lower and upper arms 160 and 162. These are in turn attached to the pivotable mounting 126 which retains the arm 114. This assembly simply provides support for the tracer 132 beyond that provided by the arm 116.

The pattern which the tracer follows in order to control the motion of the clamps in the horizontal plane is illustrated in FIGURE 6. It is supported on top of a horizontal platform 160 that is mounted on the box members 18 and the cross members 30. Preferably, the pattern 130 is retained on the platform 160 by some readily demountable means such as hand clamps (not shown).

The pattern 130 comprises a closed strip of metal sheet 162 with one edge supported on the platform 160 so that the strip extends perpendicularly to the platform. The pattern generally takes the shape of a series of straight lines joined by rounded corners. At the top edge of the interior side a chain belt 164 is fixed to the pattern. It is this chain which is engaged by the gear 154 on the lower end of the tracer.

The tracer support member 152 carries a bracket 166 extending downwardly over the outer edge of the pattern. A roller 168 is supported horizontally in the bracket 166 and is urged against the pattern by a spring 170. The roller 168 mounts directly opposite to the gear 154 so as to steady the tracer with respect to the pattern.

The bracket 166 carries three limit switches 172, 174 and 176 in a vertical stack. The arms of these limit switches pass along the outer edge of the wall 132 of the pattern. A plurality of lugs 178 are disposed about the wall of the pattern extending outwardly therefrom.

The lugs 178 are disposed at various levels along the wall of the pattern so as to engage one or more of the limit switches 172, 174 and 176 when the tracer mechanism reaches an appropriate point on the pattern.

In operation the loader may be associated with a metal working press such as the press 190 generally indicated in FIGURE 1. The press may have a die set 192 which stamps triangular workpieces out of an irregularly shaped work blank 194 (FIGURE 5). In order to obtain a maximum number of parts from the work blank 194 the blank must be fed to the press so that the points A, B, C, D, E and F are successively disposed in operating position with respect to the press. The loader is designed so that the work blank has the same orientation for each hit. This operation may be accomplished by properly supporting the blank 194 with respect to the press and moving the blank 194 through the path 200 indicated in the dotted line under FIGURE 5. Of course, other paths which similarly connect the points A, B, C, D, E and F in any order would be suitable for the device's operation.

FIGURE 6 illustrates the actual pattern used to accomplish the motion indicated by the dotted line 200 in FIGURE 5. In addition to the path through the points A, B, C, D, E and F it includes a segment generally indicated at 204 which is associated with the motion of the loader toward and away from the press in order to unload a finished workpiece and reload a new workpiece.

Assume the start of a cycle with a blank 194 loaded in the work clamps 78 and 80 and the platform disposed with respect to the press so that the point A is in a proper position for the first triangle to be cut from the blank. An appropriate lug 178 then actuates one of the limit switches 172, 174, and 176 so that the operation of the loader halts. The press then strikes and on its return actuates a limit switch (not shown) which actuates the motor 138 so that the tracer is moved along the pattern in the direction of point B. When that point is reached another lug 178 actuates one of the limit switches so as to again terminate the motion of the tracer. The press again strikes and on its return stroke reactuates the tracer so that it moves toward point C. This process is repeated until all six of the hits have been made at appropriate points and the loader stands with the blank 194 at point F.

At this point the tracer moves toward point G so as to remove the used blank from the press. At point G a lug 178 actuates the limit switch to energize the cylinder 34. This moves the clamps and the platform along with the assembly formed by the members 40, 42, 43 and 44 along the channel sections 14 and 16. This motion is terminated when the loader reaches its loading point (not shown). At this point an appropriate limit switch is actuated to open the clamps 78 and 80 dropping the finished work blank. Means, either manual or automatic, are then provided to load another blank into the clamps 78 and 80 in a proper orientation. A push button actuated either manually or associated equipment again energizes the cylinder 34 and causes it to retract its rod and move the loader back to point H. From this point the pattern regains control and the blank is advanced to point A where the cycle again begins.

Appropriate electrical control system, preferably implying real logic, is disposed within the cabinet 142. This system has as input information the limit switches 172, 174 and 176 as well as other limit switches which may be disposed on the press 190 and on the motor. The placement of the limit switches and the actual electrical circuitry is not disclosed, as it may take any of a variety of forms all within ability of those skilled in the art.

It is to be understood that the particular device disclosed is only a preferred embodiment of the invention and the true scope of the invention is to be limited only by the following claims.

I claim:

1. A device for feeding a work blank to a plurality of discrete positions with respect to an operating machine, comprising: a work holder; means for supporting the work holder in such a manner that it is free to move to any point within a bounded plane; a pattern formed of an elongated strip arranged in a closed loop configuration with one edge of the strip disposed in the horizontal plane so that the width of the strip extends in the vertical plane; a tracer operative to engage a point along the length of the pattern and to move along the pattern when powered by a rotary source; a source of rotary power operatively connected to said pattern; a mechanical linkage connecting the tracer to the work holder in such a manner that the work holder moves with the tracer through a path similar to that followed by the tracer as it moves along the pattern; a plurality of signal means disposed at various points along the length of the pattern and at various distances from the edge of the pattern; and a plurality of switch means carried by the tracer each being operative to cooperate with those of said signal means disposed at a particular distance from the edge of the pattern strip at such time as the tracer reaches the particular point along the length of the pattern at which a signal means is disposed.

2. In a device for feeding a work blank to a plurality of discrete positions with respect to an operating machine, in combination: a work holder operative to engage a planar work blank and to support it in a generally horizontal position; means for actuating said work holder so as to engage a work blank and for deactuating said work holder to release a work blank; a platform supported for movement along a first guide extending along a line in the horizontal plane; means for movably supporting said guide along a line in the horizontal plane perpendicular to said first line; vertical guide means extending from said platform and supporting said work holder; power means for adjusting the position of said work holder along said vertical guide means; a pattern comprising an elongated strip formed in a closed loop about the horizontal plane; a tracer operative to engage the pattern at a particular point including a driving member journaled in the tracer for rotation about a vertical axis and engaging said pattern so as to move said tracer along the pattern when rotated; a source of rotary power connected to said driving member; a pantograph mechanism comprising a four-element parallelogram linkage; a rotatable connection between one arm of the linkage and the tracer mechanism; a rotatable connection between the arm opposite to that connected to the tracer mechanism and the platform, whereby the platform is caused to undergo a motion similar to that of the tracer as it moves about the pattern; a plurality of limit switches carried by said tracer so as to have their arms in proximity to said pattern; a plurality of lugs disposed at discrete points about the pattern, each being positioned on the pattern so as to engage the arm of a particular one of said limit switches; and control means employing said limit switches as sensing means operative to direct the elements of the device.

References Cited by the Examiner

UNITED STATES PATENTS

| 1,836,444 | 12/31 | Carnahan. |
| 2,090,664 | 8/37 | Bruno. |
| 2,264,779 | 12/41 | Tillett. |
| 2,433,464 | 12/47 | La Plante. |
| 2,726,615 | 12/55 | Downing. |
| 3,075,651 | 1/63 | Kaden. |
| 3,114,205 | 12/63 | Bechtle. |

FOREIGN PATENTS 202,175  6/56  Australia.

GERALD M. FORLENZA, *Primary Examiner.*

HUGO O. SCHULZ, *Examiner.*